May 3, 1938.  H. HARVEY  2,116,310

ARTICLE OF FOOD

Filed Aug. 18, 1936

HOLMAN HARVEY

INVENTOR.

BY

ATTORNEY.

Patented May 3, 1938

2,116,310

UNITED STATES PATENT OFFICE 2,116,310

ARTICLE OF FOOD

Holman Harvey, New York, N. Y.

Application August 18, 1936, Serial No. 96,603

1 Claim. (Cl. 99—107)

This invention relates to an article of food, more particularly to a meat preparation of convenient character and size, so that it may be readily dispensed.

As has been well recognized for a considerable time, meats which are broiled have the most attractive and delicious flavors and the preparation of meats by broiling has become very popular. Broiled meats are readily obtained in restaurants, but at a relatively high price and heretofore it has not been feasible to obtain broiled meats in small lunch rooms, roadside stands, lunch wagons and the like at a reasonable price and in a very short time. The present invention is intended to produce a meat preparation which may be easily and quickly prepared in the presence of the customer and which can be sold at a reasonably low price.

The invention comprises providing a plurality of pieces of meat of relatively small size and roughly circular in periphery, which are secured on a rod or stick or the like, made of wood or other cellulosic or carbohydrate material. The rod may be edible and may be, for example, of a hard baked flour composition and it may have a porous structure. The pieces of meat are strung on said rod so as to be substantially in contact with each other. The rod is so formed that it may be placed in a small specially built rotisserie and broiled before an open fire, usually of gas, although other sources of heat may be used, such as charcoal, electrical resistors and the like.

The rod being of such material is non-conducting in nature so that it may be directly taken from the rotisserie and held in the hands without discomfort. This is due to the non-conducting nature of wood or the like, which confines the heat to the central portion on which the meat is held and does not conduct it to any degree towards the ends.

The invention further contemplates the seasoning and otherwise modifying of the flavor of the meat used in the present product. The wooden rod may be steeped in solutions of salt or the like and then dried, or the rod may be formed with a porous structure, or such a structure may be obtained by impressing a series of openings in the rod or by providing slots or the like. A porous structure so formed may be filled with various materials such as salt, pepper, mustard, relishes and the like. In order to further vary the flavor, one may provide vegetables in combination with the meat. To accomplish this, slices of such vegetables as onions, tomatoes, carrots, potatoes or the like may be alternated with the slices of the meat. Furthermore, there may be used on a single rod a plurality of different kinds of meats, such as beef, veal, lamb, chicken, turkey or the like.

Upon the broiling of the material on the rod, the flavor of the rod enters the meat and the juices of the meat will, at least in part, enter into the rod because of its porous nature. There will be substantially no loss of the meat juices as would be the case were a non-porous rod used. If the wood has in itself a flavor, such as hickory or the like, such a flavor will enter the meat and will add to its edibility. Where different types of meat are used in combination, the flavor of one type of meat will modify the flavors of another type, thus providing new and delicious flavors. So, also, where vegetables are used in combination with meats, the vegetables themselves will take on new flavors and will modify the flavors of the meats with which they are broiled. The various flavoring substances which may have been introduced into the rod will, of course, have their part in producing a final tasty product.

An important result of broiling of the small pieces of meat on the porous rod is that during said operation the meat will be caused to adhere to the rod by reason of the porous nature thereof and the browning effect of the fire. This has the advantage that small pieces of meat may be eaten directly from the rod without danger of part of the same accidentally falling off. It is, of course, contemplated that in certain instances, the meat, etc., may be first taken from the rod and then eaten.

In the accompanying drawing constituting a part hereof, and in which like reference characters indicate like parts:

Figure 1:
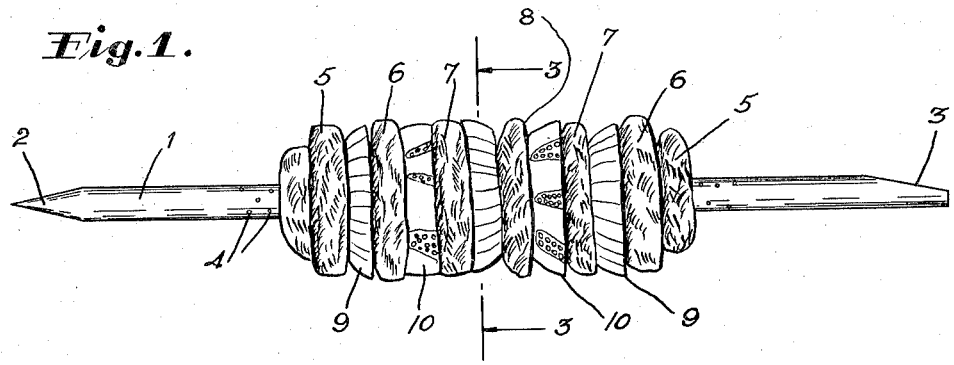
Fig. 1 is a side elevational view showing one embodiment of my invention.

A rod 1 of hickory, pine, oak, or the like, has a pointed end 2 to facilitate the stringing of the foodstuffs thereon and a flattened portion 2 at the opposite end so that the rod may be readily grasped for rotation in a suitable device, constituting part of a rotisserie. A series of openings 4, either regularly or irregularly spaced and penetrating into the body of rod 1, are provided in the central portion thereof and filled with salt, pepper or the like. On the rod there is strung a series of pieces of meat such as 5, 6, 7, 8 and the like which may be of the same type but which may be of any desired combination of types of meats. Interposed between several such pieces of meats are slices of onion 9, and slices of tomato 10. The several slices are placed in contact with each other and the whole combination may be sprinkled with salt and pepper and covered with mustard, if desired. The rod is then placed in a rotisserie with the ends 2 and 3 thereof protected from direct exposure to the fire and slowly rotated for a sufficient time to cause the desired amount of broiling of the combination. Ordinarily the pieces of meat are roughly from one inch to two inches in diameter, and because of the roughly circular outline thereof, the broiling thereof will be uniform and will be accomplished quickly. Also, because of the relatively small diameter of the various layers, the full flavors thereof are brought out by the broiling operation and the flavors from the rod have an opportunity of entering into the several layers and vice versa. Upon the removal of the rod from the rotisserie it may be immediately grasped by the hands at the cool ends thereof and eaten while the meat is hot.

Figure 2:
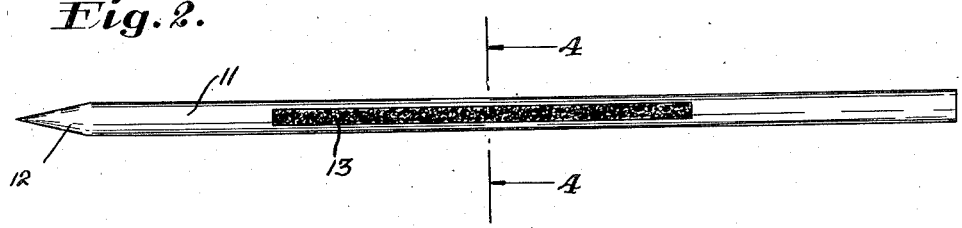
Fig. 2 is a similar side elevational view of a modified form of rod prior to the impaling thereon of the foodstuffs.
Figure 3:
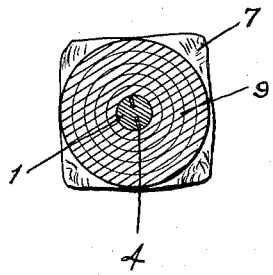
Fig. 3 is a transverse cross-sectional view of the modification of Fig. 1 taken along the line 3—3.
Figure 4:
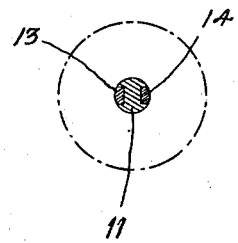
Fig. 4 is a similar transverse cross-sectional view of rod, taken along the line 4—4 of Fig. 2.

In Fig. 1 I have illustrated a modification in which the rod has small needle openings for the introduction of salt and pepper or the like. In some cases, it is desirable to introduce larger amounts of flavoring substances of a varied character. In such case, the rod 11 of Fig. 2 is provided with the pointed end 12 and in the central portion thereof in place of the needle openings, there are provided two slots 13 and 14 on opposite sides of the rod and generally parallel to each other. These slots have a sufficient volume so that a substantial amount of such flavoring substances as mustard, relishes and the like may be introduced therein. The various meats with or without intermediate slices of vegetables may then be introduced onto the rod and treated as described above.

From the above it will be seen that the present invention has a number of advantages over prior methods and prior products of this type. One of the important advantages is that small and irregularly sized pieces of meat which are normally considered waste, or at least are considered as of but small value, may be used very effectively in the present invention. The new products may be so varied in character that new and delicious flavors, arising from the many possible combinations of foodstuffs, may be obtained.

While it is contemplated that combinations such as shown in Fig. 1 shall be produced in a central plant and distributed in completed form to the consumer, I may provide the elements in a single package, as for example, the rods and the like already cut to the proper size, and allow the consumer to make whatever combination in whatever amount he desires. Various other meats than those named above may be used in the present invention as, for example, sausages of various types and even slices or pieces of fish may be treated in the same manner, or vegetables themselves with or without meats may be broiled in accordance with the above and the claim includes the same. The rod itself may be artificially made, as for example, from compressed cellulose, vulcanized fiber or other synthetic or molded materials. In order to obtain the non-conduction feature, it is not necessary that the entire rod be made of wood or the like, but the ends thereof may be provided with non-conducting handles if desired.

The means for producing porosity in the rod may be used in place of those shown and described above, and the slots of Fig. 2 may be formed into a single slot extending thru the rod. The vegetables may be omitted altogether and but a single type of meat may be threaded on the rod. The shape of the meat need not be circular but other regular or irregular forms may be used. These and other changes may be made in my invention within the spirit thereof, and the invention is to be broadly construed and not to be limited except by the character of the claim appended hereto.

What I claim is:

An article of food comprising a rod of cellulosic material having a porous structure, said rod being substantially a non-conductor of heat, a plurality of relatively small pieces of meat impaled on said rod and substantially in contact with each other on the central portion of said rod, said rod being of wood and the article having been broiled, openings in said rod, condiments contained in said openings, the broiling operation causing said condiments to become dispersed within said pieces of meat, whereby the wood flavor enters the meat and vice versa, while the ends of said rod remain sufficiently cool so as to be capable of being held in the hands.

HOLMAN HARVEY.